United States Patent [19]

Rueger

[11] Patent Number: 4,991,959
[45] Date of Patent: Feb. 12, 1991

[54] OPTO-ELECTRONIC SIGHT

[75] Inventor: Roderich Rueger, Munich, Fed. Rep. of Germany

[73] Assignee: Messerschmitt-Boelkow-Blohm GmbH, Munich, Fed. Rep. of Germany

[21] Appl. No.: 276,215

[22] Filed: Nov. 23, 1988

[30] Foreign Application Priority Data

Nov. 24, 1987 [DE] Fed. Rep. of Germany ....... 3739698

[51] Int. Cl.$^5$ ............................................ G02B 23/10
[52] U.S. Cl. .................................................. 356/251
[58] Field of Search ......................... 356/251; 250/333

[56] References Cited

FOREIGN PATENT DOCUMENTS 2714412 10/1978 Fed. Rep. of Germany .
3428990 2/1986 Fed. Rep. of Germany .
2149141 6/1985 United Kingdom ................ 356/251

Primary Examiner—Davis L. Willis
Assistant Examiner—Matthew W. Koren
Attorney, Agent, or Firm—W. G. Fasse; D. H. Kane, Jr.

[57] ABSTRACT

In an opto-electronic sight, including several optical devices, the separate optical axes are combined by means of mirrors and beam splitters so that all the beam paths amay be directed exactly at the same sight point, either directly or via a directing and stabilizating mirror. Axis alignment errors and the need for axis adjustment are eliminated.

20 Claims, 1 Drawing Sheet

OPTO-ELECTRONIC SIGHT

FIELD OF THE INVENTION

The invention relates to an opto-electronic sight including several optical devices having their opticalaxes aligned in parallel.

BACKGROUND INFORMATION

A sight of the above described general type is known, for example, from German Patent Publication (DE-AS) 2,714,412 in which a sighting marker is superimposed or coupled-into an optical system including a receiver and a sighting device. The super-position or coupling-in is achieved in that the sighting marker is reflected into one branch of the sighting device through a beam splitter element and a triple optical element directed or oriented toward the receiver and arranged on the beam splitter element on its side facing away from the receiver.

A sight of the general type described above is also disclosed in German Patent Publication (DE-OS) 3,428,990 which is owned by the Assignee of the present invention. DE-OS 3,428,990 discloses an apparatus for harmonizing the optical axes of a sight whereby the apparatus generally described in the above mentioned reference DE-AS 2,714,412 is improved with respect to minimizing the effort of axes follow-up adjustments and with regard to the constancy of an axis harmonization or alignment once it has been achieved. As disclosed, the sight or view of the scene to be viewed through the apparatus takes place on the other side of the beam splitter or beam splitters, respectively. Furthermore, a triple mirror is arranged on an extension of the optical axis of the second and every succeeding optical device. A cross hair reticle or sighting marker is located at the focal plane or image plane of one of the optical devices so that the cross hair reticle is projected via the beam splitters and triple reflector mirrors into the image plane of each of the other optical devices.

It has been found that in the art the relative adjustment or alignment of the various devices including in the sight such as a sighting telescope, a thermal imaging device, and a TV apparatus, must be achieved with an accuracy in the micrometer range in at least two axes. For aligning the optical axes of the above mentioned devices or sensors with a high precision onto the same target or sight point it is necessary to achieve an axes parallelism or alignment accuracy of 0.1 mrad requiring a support surface 10 cm in length, and a tolerance of only 10 $\mu$m of an axes deviation is permissible or allowable.

OBJECTS OF THE INVENTION

In view of the foregoing it is the aim of the invention to achieve the following objects singly or in combination:

to improve an opto-electronic sight of the above described type so that the axes of all of the optical devices included in the sight may be aligned exactly onto the same sight point without measuring the orientations of the separate axes and without adjusting or fixing the separate optical devices;

to allow several sight points, for example, cross hair reticles or other sighting images to be projected simultaneously in such an opto-electronic sight;

to make the sighting window and sighting mirror of such an opto-electronic sight considerably smaller; and to eliminate various adjustment means from such an opto-electronic sight, thereby making it smaller, lighter, and less expensive.

SUMMARY OF THE INvENTION

The above objects have been achieved according to the invention in an opto-electronic sight including several optical devices such as sensors arranged with their optical axes aligned exactly in parallel, wherein a cross hair projector projects a cross hair reticle into at least two of the optical devices. The cross hair reticle is projected through a beam splitter, which is semi-transparent. Due to these characteristics of the beam splitter a reflected image of the cross hair reticle is received in a first device, for example, a thermal imaging device. The cross hair reticle image passing through the beam splitter is directly imaged in a second device, for example, a sighting telescope. This arrangement permits viewing an external landscape image or other sight by the thermal imaging device directly through the beam splitter. The second device in the form of the sighting telescope and possibly further devices receive the landscape image as reflected or mirrored by the same beam splitter. In this arrangement the optical axes of the first device and of the second device are oriented approximately perpendicularly to each other at the beam splitter and the optical axis of the cross hair reticle projector exactly aligns with the optical axis of the second optical device or sighting telescope. Further, between the beam splitter and the scene being viewed, that is downstream of the beam splitter, the axes of the optical devices are exactly in parallel to each other so that an axes harmonization is automatically enforced by the beam splitter.

According to further embodiments of the invention the cross hair reticle projector projects the cross hair reticle or sighting mark directly onto the scene to be viewed. The reticle may then be viewed or detected by each of the optical devices of the optoelectronic sight. The reticle projector can project several or various cross hair shapes or sighting mark shapes into the devices by operating in a spectral separating mode. Additional optical devices may be arranged to receive the same viewing scene and the same cross hair sighting mark by appropriately arranging additional beam splitter elements, for example, along the optical axis of the reticle projector. Preferably, the cross hair reticle projector operates over a spectral range of wave lengths less than 7.5 $\mu$m, preferably between 1.8 $\mu$m and 2.4 $\mu$m in order to project the reticle sighting mark into a thermal imaging device. The cross hair reticle or other sighting mark may be continually projected into all the devices or alternatively may be projected only into selected devices or all devices only for a short time during an axis alignment mode. In addition to a cross hair reticle sighting mark a test pattern for testing and adjusting the sensitivity and resolution of the various optical devices or visual images of the target to be sighted may be projected into the optical devices.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
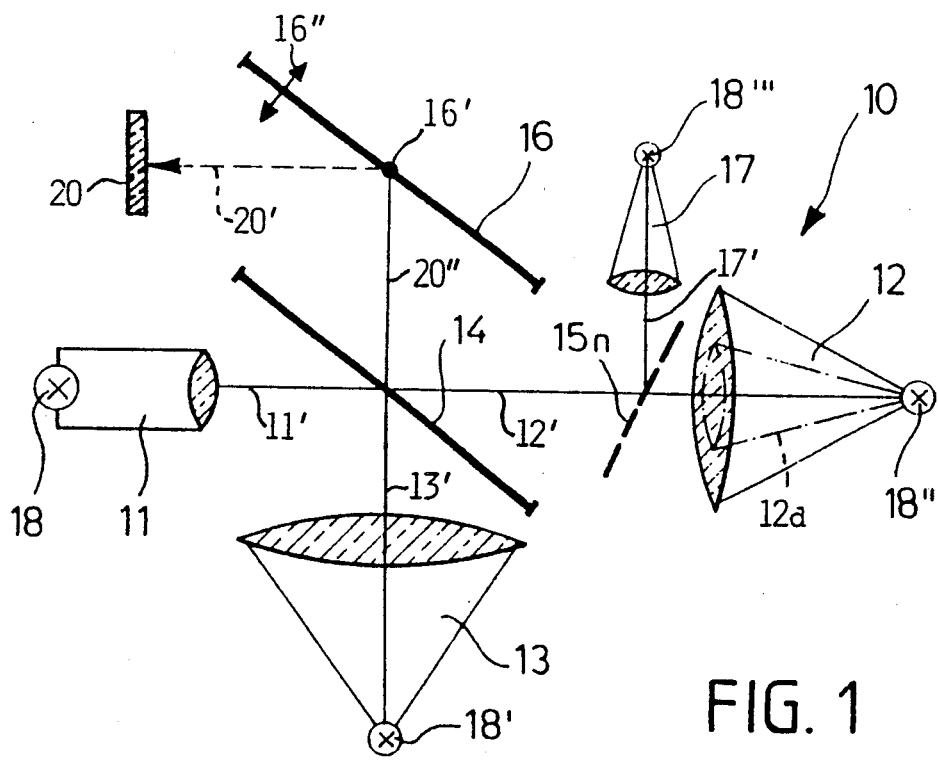
FIG. 1 is a schematic view of a first embodiment of an opto-electronic sight arrangement including several optical devices or sensors.

As shown schematically in FIG. 1 an opto-electronic sight arrangement 10 comprises a collimated sighting image projector 11 which projects, for example, a cross hair reticle as a sighting mark 18 into first and second optical devices 13 and 12 respectively. In this example embodiment the first optical device is a thermal imaging device 13 and the second optical device is a sight telescope 12. The cross hair sighting mark 18 is projected through a semitransparent beam splitter 14 to be imaged directly in the sight telescope 12 as a sighting mark 18" and is reflected from the beam splitter 14 to be imaged indirectly in the thermal imaging device 13 as a sighting mark 18'. The external scene to be viewed or sighted, is viewed through a sight window 20, whereby the image to be viewed passes through the beam splitter 14 to be imaged in the thermal imaging device 13. The beam splitter 14 reflects the image to be viewed into the sight telescope 12. In both instances the image to be viewed may be reflected by a stabilizing mirror 16 that is tiltable about an axis 16' as indicated by the arrow 16" and/or about a gland or pivot axis not shown in the figures.

The dimensions of the beam splitter 14 are chosen either to match the dimensions of the optical element of the sight telescope 12 or to match the dimensions of the optical element of the thermal imaging device 13. In FIG. 1 the beam splitter 14, taking its slant into account is large enough to cover the lens of the thermal imaging device 13. As further shown in FIG. 1, the directing or stabilizing mirror 16 may be movably arranged in the viewing path of the optical devices 12 and 13 in front of or upstream of the sight window 20. In the embodiment shown in FIG. 1, the image viewed in the sight telescope 12 would be laterally reversed or inverted relative to the image in the device 13. In order to avoid or correct this optical inversion, a further inverter mirror which is not shown in FIG. 1, may be arranged in the beam path of the optical device 12 or 13. If the optical device 12 is a TV camera device, instead of a sight telescope as shown in this embodiment, the inverting mirror is not necessary because the image may simply be electronically inverted.

By appropriately arranging further beam splitters 15n the sighting mark and the scene to be viewed may further be projected into additional optical devices 17 in which the sighting mark 18 is imaged as a sighting mark 18'''. The cross hair projector 11 may operate in a spectral separation or division mode in order to project several different sighting markers in the form of different cross hair reticle shapes or sighting marks or even test patterns into the various optical devices 12, 13, and 17.

In the sighting device of the invention as shown in FIG. 1, all the components 11, 12, 13, 14, 15, 16, and 17 may drift relative to one another, yet all the optical axes remain precisely aligned or directed at the same viewing point in the external scene or landscape as viewed through the mirror 16. This is achieved because a single reticle or cross hair projecting beam 11' and a single viewing beam 20' are each split appropriately to be imaged in the various optical devices 12, 13, and 17. In other words, the optical axes 12', 13' and 17' of the optical devices 12, 13, and 17 are combined by means of the beam splitters 15n and 14 to form a single viewing axis 20' which is directed through the sight window 20 out onto the scene to be viewed.

Furthermore, the minimum achievable axis alignment error between the several optical devices or sensors, which has previously typically been limited to an accuracy of 0.1 mrad, is eliminated by the invention which achieves an essentially perfect axes alignment. Another advantage is seen in that the parallax effect between the device axes 12', 13' which previously typically amounted to an error of approximately 0.1 mrad is also completely eliminated in the arrangement according to the invention. The stabilizing viewing or sighting mirror 16 and the sight window 20 can be made considerably smaller than heretofore. The axis alignment or harmonization is fully maintained even if the field of view is switched or changed by means of afocal structural elements, such as shown at 12d in FIG. 1, which may be tilted into the sight path. The need for adjusting or aligning the separate devices is eliminated whereby various adjustment means are also eliminated from the present device. As a result, the present sight arrangement becomes lighter, smaller, and less expensive. Furthermore, axis-unstable sensors or optical devices may be used herein, whereby even in such a case the axis alignment or harmonization of all the sensor axes with respect to one another is maintained according to the invention.

Figure 2:
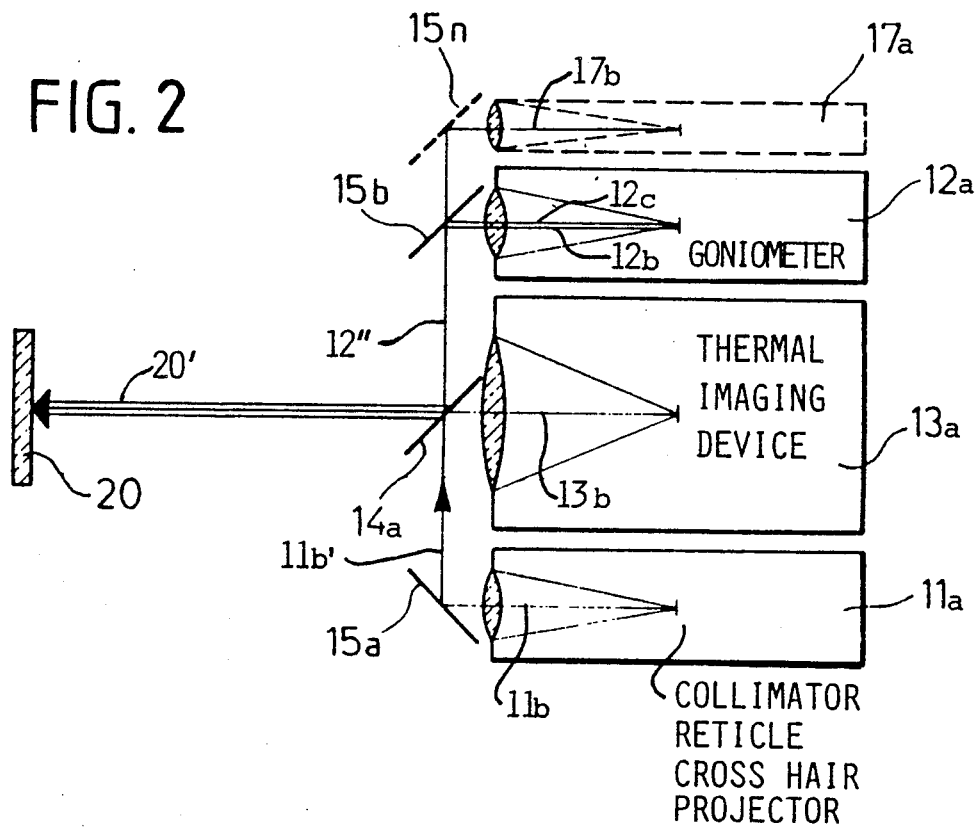
FIG. 2 is a schematic view of an alternative embodiment of an opto-electronic sight arrangement, wherein the optical devices or sensors are arranged next to one another with their optical axes aligned in parallel to each other.

The example embodiment shown in FIG. 2 illustrates an opto-electronic sight arrangement including several optical devices 11a, 13a, 12a, and 17a with their axes 11b; 13b; 12b, 12c; and 17b are arranged nearly parallel to one another. The optical devices 11a, 13a, 12a, and 17b essentially correspond to the respective devices 11, 13, 12, and 17 described with reference to FIG. 1, except that in FIG. 2 the optical device 12a is a TV/DVO device (television/direct view optics). The device 12a may include a goniometer or laser range finder (LRF). The optical axes or beam paths of the devices 12a, 13a, and 17a are combined by means of beam splitters 15b, 14a, and mirror 15n respectively to form a single viewing axis or sight axis 20' which extends through the sight window 20 into the external landscape or scene to be viewed. Here, the beam splitter 14a is smaller than the lens diameter of the thermal imaging device 13a. Furthermore, the cross hair reticle projector 11a projects a beam which is reflected from a directing and inverting mirror 15a and then partially reflected from the backside of the beam splitter 14a to be imaged as a sighting mark in the thermal imaging device 13a. The projected cross hair beam partially passes through the beam splitter 14a and is partially reflected from the beam splitter 15b to form a cross hair image as a sighting mark in the goniometer device 12a and to be further reflected from a reflector 15n to form a cross hair sighting mark image in the optical device 17a. If additional optical devices are to be provided, the reflector 15n can be a beam splitter and further beam splitters and optical devices would be arranged in a manner analogous to the optical device 17a.

In the example embodiment shown in FIG. 2, as in the example embodiment of FIG. 1, axes alignment errors between the optic axes of the various optical devices of the opto-electronic sight do not arise, even under conditions of sensor axis drifting for any size field of view, etc., that is to say, under any conditions. Furthermore, as noted above, the sight window 20 may be made considerably smaller than heretofore in FIG. 2 and, if needed, an additional directing or stabilizing mirror may be provided as described with reference to FIG. 1, whereby the directing or stabilizing mirror could also be quite small. This arrangement is free of any parallax errors and requires no adjustment or alignment of the several optical axes. Hence, a substantial advance has been achieved.

The cross hair projector 11 or 11a preferably operates in the spectral range of wave lengths between 1.8 μm and 2.4 μm for projecting into the thermal imaging device 13 or 13a because glass and germanium, which is used in the thermal imaging optics, are transparent over this spectral range and the diffraction limited diameter of the projector optical elements can be made smaller. The projector 11, 11a can project as a sighting image target images, for example, at the edge or margin of the viewing field in the optical devices or sensors. Such additional target images may be used for testing the optical devices or especially also for an automatic target scanning and locating method. The term sighting image as used herein is intended to encompass the sighting marks 18, 18', 18", 18'" and the above mentioned target images.

It is critical for the harmonization according to the invention that in both embodiments the relevant optical axes extend approximately at right angles to each other at the location of the beam splitter and exactly in parallel downstream, as seen in the viewing direction, of the beam splitter. This condition is satisfied in FIG. 1 by the axes 12' and 13' extending approximately at a right angle to each other in the beam splitter 14, and by the beams 20" or 20' extending exactly in parallel to each other. This condition is also satisfied in FIG. 2 wherein the axes 13b and 12" extend nearly at a right angle to each other in the beam splitter 14a while the axes or beams 20' extend exactly in parallel to each other.

Although the invention has been described with reference to specific example embodiments, it will be appreciated, that it is intended to cover all modifications and equivalents within the scope of the appended claims.

What I claim is:

1. An opto-electronic sight, comprising a first optical device (13, 13a) having a first optical axis (13', 13b), a second optical device (12, 12a) having a second optical axis (12', 12"), a third optical device forming a sighting image projector means (11, 11a) controlled to operate intermittently for short periods of times, said sighting image projector means being arranged separate from said first and second optical devices, said separate sighting image projector means having a third optical axis (11', 11b') for projecting a sighting image (18) into said first and second optical devices, and beam splitter means (14, 14a) arranged for passing a scene beam directly through said beam splitter means to one of said first and second optical devices and for simultaneously deflecting a portion of said scene beam to the other of said first and second optical devices, said first and second optical devices being so arranged relative to said beam splitter means that the respective first and second optical axes (13', 13b; 12', 12") extend approximately at a right angle to each other upstream of said beam splitter means (14, 14a) and exactly in parallel to each other downstream of said beam splitter means, whereby harmonization of said first and second optical axes is automatically enforced through said beam splitter means (14, 14a), said third optical axis (11', 11b') of said separate sighting image projector means (11, 11a) being oriented to coincide with one of said first and second optical axes and to intersect the other of said first and second optical axes in said beam splitter means (14, 14a) so that said sighting image is projected simultaneously into said first and second optical devices.

2. The opto-electronic sight of claim 1, wherein said sighting mark image projector mans is arranged for directly projecting said sighting image through said beam splitter means into said second optical device (12, 12a) and for indirectly projecting said sighting image as reflected by said beam splitter means into said first optical device (13, 13a).

3. The opto-electronic sight of claim 1, comprising further deflector means (15a, 15b) arranged for deflecting said scene beam for one of said first and second optical devices and a sighting image beam from said sighting image projector means toward said beam splitter means, wherein said first and second optical axes (12b, 13b) of said first and second optical devices and said third optical axis (11b) of said image projector means (11a) extend in parallel to each other upstream of said further deflector means said beam splitter means (14a) being arranged for passing and deflecting said scene beam (20'), said further deflector means (15a, 15b, . . . ) deflecting said sighting image beam into said first and second optical devices.

4. The opto-electronic sight of claim 1, wherein said sighting image projector mans directly projects said sighting image onto said external scene so that said scene beam comprises said sighting image for viewing by said first and second optical devices.

5. The opto-electronic sight of claim 1, wherein said beam splitter means is so dimensioned that, taking its slant into account, the beam splitter means (14) covers the diameter of optics of said first optical device (13).

6. The opto-electronic sight of claim 1, wherein said first optical device comprises a thermal imaging device (13), and wherein said second optical device comprises a sighting telescope (12).

7. The opto-electronic sight of claim 1, wherein said sighting image projector means comprises a reticle projector for projecting said sighting image in the form of a cross hair reticle.

8. The opto-electronic sight of claim 1, comprising at least one further optical device (17) and further beam splitter means (15n) arranged to project an image into said further optical device.

9. The opto-electronic sight of claim 1, wherein said sighting image projector means comprises means for dividing a spectrum to project several different reticle shapes or target point shapes into said optical devices by spectral division.

10. The opto-electronic sight of claim 1, further comprising an inverting mirror arranged for inverting an image projected into said first optical device.

11. The opto-electronic sight of claim 1, further comprising a directing and stabilizing mirror (16) movably arranged in the path of said scene beam.

12. The opto-electronic sight of claim 1, wherein said sighting image projector means operates in a spectral range of wave lengths between 0.1 μm and 7.5 μm.

13. The opto-electronic sight of claim 1, wherein said sighting image projector means comprise mans for projecting target images into said scene, and means for generating said sighting images in response to the projecting of a target image.

14. The opto-electronic sight of claim 1, wherein said sighting image projector means comprise means for electronically generating said sighting image and tracking means for tracking and properly positioning said sighting image relative to a target.

15. The opto-electronic sight of claim 1, wherein said sighting image projector means comprise means for projecting a test pattern image into said optical devices for testing and calibrating the sensitivity and resolution of said optical devices.

16. The opto-electronic sight of claim 1, wherein said sighting image projector means comprise means for projecting a target image of an interesting target that may be expected in a viewed scene, into said optical devices for comparing said target image as a reference image with an actual target in a viewed scene.

17. The opto-electronic sight of claim 1, wherein said beam splitter means is dimensioned that, taking its slant into account, the beam splitter means (14a) covers less than the full diameter of optics of said first optical device (13a).

18. An opto-electronic sight, comprising a first optical device (13, 13a) having a first optical axis (13', 13b), a second optical device (12, 12a) having a second optical axis (12', 12''), sighting image projector means (11, 11a) having a third optical axis (11', 11b') for projecting a sighting image (18) into said first and second optical devices, beam splitter means (14, 14a) arranged for passing a scene beam directly through said beam splitter means to one of said first and second optical devices and for simultaneously deflecting a portion of said scene beam to the other of said first and second optical devices, said first and second optical devices being so arranged relative to said beam splitter means that the respective first and second optical axes (13', 13b; 12', 12'') extend approximately at a right angle to each other upstream of said beam splitter means (14, 14a) and exactly in parallel to each other downstream of said beam splitter means, whereby harmonization of said first and second optical axes is automatically enforced through said beam splitter means (14, 14a), said third optical axis (11', 11b') of said sighting image projector means (11, 11a) being oriented to coincide with one of said first and second optical axes and to intersect the other of said first and second optical axes in said beam splitter means (14, 14a) so that said sighting image is projected simultaneously into said first and second optical devices, and deflector means (15a, 15b) arranged for deflecting said scene beam for one of said first and second optical devices and a sighting image beam from said sighting image projector means toward said beam splitter means, wherein said first and second optical axes (12b, 13b) of said first and second optical devices and said third optical axis (11b) of said image projector means (11a) extend in parallel to each other upstream of said deflector means (15a, 15b), said beam splitter means (14a) being arranged for passing and deflecting said scene beam (20'), said deflector means (15a, 15b, ...) deflecting said sighting image beam into said first and second optical devices.

19. An opto-electronic sight, comprising a first optical device (13, 13a) having a first optical axis (13', 13b), a second optical device (12, 12a) having a second optical axis (12', 12''), sighting image projector means (11, 11a) having a third optical axis (11', 11b') for projecting a sighting image (18) into said first and second optical devices, beam splitter means (14, 14a) arranged for passing a scene beam directly through said beam splitter means to one of said first and second optical devices and for simultaneously deflecting a portion of said scene beam to the other of said first and second optical devices, said first and second optical devices being so arranged relative to said beam splitter means that the respective first and second optical axes (13', 13b; 12', 12'') extend approximately at a right angle to each other upstream of said beam splitter means (14, 14a) and exactly in parallel to each other downstream of said beam splitter means, whereby harmonization of said first and second optical axes is automatically enforced through said beam splitter means (14, 14a), said third optical axis (11', 11b') of said separate sighting image projector means (11, 11a) being oriented to coincide with one of said first and second optical axes and to intersect the other of said first and second optical axes in said beam splitter means (14, 14a) so that said sighting image is projected simultaneously into said first and second optical devices, and wherein said sighting image projector means comprises means for dividing a spectrum to project several different reticle shapes or target point shapes into said optical devices by spectral division.

20. An opto-electronic sight, comprising a first optical device (13, 13a) having a first optical axis (13', 13b), a second optical device (12, 12a) having a second optical axis (12', 12''), sighting image projector means (11, 11a) having a third optical axis (11', 11b') for projecting a sighting image (18) into said first and second optical devices, beam splitter means (14, 14a) arranged for passing a scene beam directly through said beam splitter means to one of said first and second optical devices and for simultaneously deflecting a portion of said scene beam to the other of said first and second optical devices, said first and second optical devices being so arranged relative to said beam splitter means that the respective first and second optical axes (13', 13b; 12', 12'') extend approximately at a right angle to each other upstream of said beam splitter means (14, 14a) and exactly in parallel to each other downstream of said beam splitter means, whereby harmonization of said first and second optical axes is automatically enforced through said beam splitter means (14, 14a), said third optical axis (11', 11b') of said sighting image projector means (11, 11a) being oriented to coincide with one of said first and second optical axes and to intersect the other of said first and second optical axes in said beam splitter means (14, 14a) so that said sighting image is projected simultaneously into said first and second optical devices, and wherein said sighting image projector means comprise means for projecting a test pattern image into said optical devices for testing and calibrating the sensitivity and resolution of said optical devices.

* * * * *

UNITED STATES PATENT AND TRADEMARK OFFICE
CERTIFICATE OF CORRECTION

PATENT NO. : 4,991,959
DATED : February 12, 1991
INVENTOR(S) : Roderich Rueger

It is certified that error appears in the above-identified patent and that said Letters Patent is hereby corrected as shown below:

In [57] Abstract, line 4, replace "amay" by --may--;
                 line 5, replace "stabilizating" by
                          --stabilizing--;
Column 6, line 37, replace "mans" by --means--;
Column 7, line 3, replace "between 0.1 µm and" by
                          -- between 1.0 µm and--;
Column 7, line 5, replace "mans" by --means--.

Signed and Sealed this

Twenty-third Day of June, 1992

Attest:

DOUGLAS B. COMER

*Attesting Officer*     *Acting Commissioner of Patents and Trademarks*